(12) United States Patent
Klemm et al.

(10) Patent No.: US 10,554,068 B2
(45) Date of Patent: Feb. 4, 2020

(54) ELECTRICAL CIRCUIT AND METHOD FOR CHARGING A SECONDARY BATTERY

(71) Applicant: Braun GmbH, Kronberg (DE)

(72) Inventors: Torsten Klemm, Eschborn (DE); Lorraine Rispal, Heidesheim (DE); Ferdinand Hermann, Königstein (DE); Thomas Hohmann, Gelnhausen (DE)

(73) Assignee: Braun GMBH, Kronberg (DE)

( * ) Notice: Subject to any disclaimer, the term of this patent is extended or adjusted under 35 U.S.C. 154(b) by 39 days.

(21) Appl. No.: 15/969,214

(22) Filed: May 2, 2018

(65) Prior Publication Data

US 2018/0323622 A1 Nov. 8, 2018

(30) Foreign Application Priority Data

May 8, 2017 (EP) ..................................... 17169949
Mar. 21, 2018 (EP) ..................................... 18163127

(51) Int. Cl.
*H02J 7/00* (2006.01)

(52) U.S. Cl.
CPC .................................. *H02J 7/008* (2013.01)

(58) Field of Classification Search
CPC .......................... H02J 7/008; H02M 2001/0025
USPC ..................................................... 320/140, 144
See application file for complete search history.

(56) References Cited

U.S. PATENT DOCUMENTS

| | | | | |
|---|---|---|---|---|
| 5,661,643 A | * | 8/1997 | Blakely | H02M 1/10 363/21.16 |
| 5,939,863 A | * | 8/1999 | Miller | H02H 3/087 320/136 |
| 6,163,202 A | * | 12/2000 | Mao | H02M 3/156 323/907 |

* cited by examiner

*Primary Examiner* — Richard V Muralidar
(74) *Attorney, Agent, or Firm* — Kevin C. Johnson (57) ABSTRACT

An electrical circuit for charging a secondary battery that comprises a dc-converter and an output connector that can be connected to the positive terminal of the secondary battery for applying a charging current to the secondary battery. The dc-converter has a voltage feedback connector for sensing a feedback voltage, wherein the dc-converter is adapted to regulate the output voltage by adjusting the output current at the output connector depending on the sensed feedback voltage and a feedback-sub-circuit connected to the output connector and to the voltage feedback connector of the dc-converter.

15 Claims, 3 Drawing Sheets

Prior Art

Fig. 1

Prior Art

ELECTRICAL CIRCUIT AND METHOD FOR CHARGING A SECONDARY BATTERY

FIELD OF THE INVENTION

The invention relates to an electrical circuit for charging a secondary battery having a dc-converter, for example implemented in household appliances such as hair cutting or removal appliances (shaver, epilator), toothbrushes or skin treatment devices (massage). The dc-converter of the circuit comprises an input connector connectable to an input dc voltage and an output connector connectable to the positive terminal (also denoted as "anode" in this text) of the secondary battery for applying a charging current to the secondary battery. The dc-converter further comprises a voltage feedback connector for sensing a feedback voltage, wherein the dc-converter is adapted to regulate the output voltage by adjusting the output current at the output connector depending on the sensed feedback voltage. The electrical circuit further comprises a feedback-sub-circuit connected to the output connector and to the voltage feedback connector of the dc-converter.

BACKGROUND OF THE INVENTION

Mobile devices, like mobile phones, notebooks, tablet computers, etc. are getting more and more powerful every day. Also, a vast variety of former stationery appliances with high power consumption are getting available in mobile versions. This progress is mainly made possible by the increasing performance of secondary batteries that can now supply the power required to run these devices. Also, the capacity of secondary batteries is now high enough to provide power to these devices for the required amount of time. When the battery charge is depleted, the secondary batteries should be recharged with an appropriate charging device.

Modern secondary batteries, like lithium-ion batteries, which are widely used in small electronic devices, should be charged with special electronic chargers adapted to their charging properties. The charging properties depend on the chemical conversion of the energy inside the secondary battery, where several conditions must be met to ensure the safety of the device, to avoid damage to the battery and to maintain the battery lifetime. Known chargers use direct charging with a limited charging current utilizing an appropriate power supply unit or a power supply independent topology with the constant current/constant voltage method (CC/CV).

With this constant current/constant voltage method, at first batteries are charged with a constant current, avoiding an excessive charging current, especially in the beginning of charging. The constant current phase continues until the end charging voltage is reached. At that time, approximately 70% to 80% of the nominal capacity of the secondary battery is reached. Subsequently, charging commences with constant voltage, thereby ensuring that the end charging voltage is not exceeded. In the constant voltage phase, the charging current decreases gradually with increasing battery charge.

To implement such a method into a charging device, special charging ICs are necessary. For small power requirements, it is common to use integrated charging ICs. The drawback of such charging ICs is a high complexity to provide for the required functionality. This leads to a large chip area, a high number of pins, long time requirements for testing and especially high cost of the device. Another important drawback is a lack of transparency for the developers due to the "black-box" behavior of the charging ICs. This makes it difficult to combine the charging IC with own microcontrollers and/or software because the developer does not have access to the working details of the charging IC.

For low-cost devices, simple dc-converters are used with a shunt resistor for charging a secondary battery. With such a device, for low battery voltage, the dc-converter always delivers its maximum output current to the secondary battery. The charging current is therefore only reducing, when the battery voltage is coming closer to the end voltage. This leads to an excessive heating up of the dc-converter in the beginning of charging and to very high charging currents leading to a severe reduction of battery lifetime.

It is therefore an object of the present invention to provide a simple and low-cost electrical circuit for charging a secondary battery that ensures safety, avoids damage to the secondary battery and maintains the battery lifetime, in particular for household appliances such as hair cutting or removal appliances (shaver, epilator), toothbrushes or skin treatment devices (massage). It is a further object of the present invention to provide a secondary battery over current protection.

SUMMARY OF THE INVENTION

According to one aspect of the invention an electrical circuit for charging a secondary battery comprises a dc-converter. Such a dc-converter comprises an input connector to an input dc voltage and an output connector that can be connected to the positive terminal (anode) of the secondary battery for applying a charging current to the secondary battery. The dc-converter further comprises a voltage feedback connector for sensing a feedback voltage, wherein the dc-converter is adapted to regulate the output voltage by adjusting the output current at the output connector depending on the sensed feedback voltage. The electrical circuit further comprises a feedback-sub-circuit connected to the output connector and to the voltage feedback connector of the dc-converter. The feedback-sub-circuit comprises a positive temperature coefficient resistor connectable in series to the secondary battery, disposed in the electrical circuit between the negative terminal (also denoted as "cathode" in this text) of the secondary battery and the ground connector of the dc-converter (also denoted as "ground" in this text) such that an increasing resistance of the positive temperature coefficient resistor results in an increasing voltage at the voltage feedback connector.

According to a further aspect, a method for charging a secondary battery is provided with an electrical circuit as defined above, wherein the charging current of the secondary battery flows through the resistor with a positive temperature coefficient, the resistance of the resistor with a positive temperature coefficient increases due to the current through the resistor, the increased resistance limits the charging current of the secondary battery and results in the feedback-sub-circuit providing a higher voltage to the feedback input of the dc-converter.

DETAILED DESCRIPTION OF THE INVENTION

The proposed electrical circuit for charging a secondary battery comprises a dc-converter. The dc-converter comprises an input connector to an input dc voltage which functions as the supply voltage for the dc-converter. The dc-converter further comprises an output connector that can be connected to the positive terminal, or anode, of the secondary battery for applying a charging current to the secondary battery.

The dc-converter further comprises a voltage feedback connector for sensing a feedback voltage, wherein the dc-converter is adapted to regulate the output voltage by adjusting the output current at the output connector depending on the sensed feedback voltage.

The standard operation of a dc-converter is such that the dc-converter tries to maintain the voltage at the voltage feedback connector to its specified feedback voltage value. Depending on the voltage at the feedback converter, the dc-converter typically changes an internal pulse width modulation in order to adjust or regulate the output voltage and the output current. Hence, the dc-converter regulates its output voltage by adjusting its output current. If the feedback voltage is lower than the specified feedback voltage value, the dc-converter increases its output current at the output connector until the feedback voltage reaches the specified feedback voltage value. If the feedback voltage is higher than the specified feedback voltage value, no current or a reduced current is delivered at the output connector.

A typical behavior of a standard dc-converter might be as follows: The value of the output current (i.e. the current delivered at the output connector) is directly related to the difference "specified feedback voltage value"–"feedback voltage". The bigger the difference, the higher is the current. When the difference is negative, no current is delivered, irrespective of the amount of the difference.

A suited DC converter proposed in line with the described circuits might give full current (i.e. the maximum current according to the specifications of the dc-converter) when the difference "specified feedback voltage value"–"feedback voltage" is larger than about 50 mV. In the range 0V<"specified feedback voltage value"–"feedback voltage"<50 mV a current proportional to difference might be regulated for.

The proposed circuit or method would also work if the current is not related to voltage difference, i.e. if full current is provided when the predefined difference is positive, and no current is provided, when the predefined difference is negative. However, the before described dc-converters giving in a certain range of the difference "specified feedback voltage value"–"feedback voltage" an output current proportional to the value of the difference might give better results and a smoother control.

The dc-converter can be realized as a single IC (integrated circuit) with only integrated components or as an IC with supplementary components such as a coil and a capacitor. It is also possible that the dc-converter is constructed by discrete electric components.

The electrical circuit further comprises a feedback-sub-circuit connected to the output connector and to the voltage feedback connector of the dc-converter. This feedback-sub-circuit comprises a positive temperature coefficient resistor connectable in series to the secondary battery such that an increasing resistance of the positive temperature coefficient resistor results in an increasing voltage at the voltage feedback connector.

The term "connected in series" as used herein can be understood as "connected along a single path". According to the invention, the positive temperature coefficient resistor is disposed in the electrical circuit between the negative terminal (cathode) of the secondary battery and ground. A connection to ground may be achieved by a connection to the ground connector of the dc-converter.

It is to be noted that essentially the same current (charging current) flows through all of the components connected in series, i.e. the battery and the positive temperature coefficient resistor. The current flowing through the other connected components, i.e. the feedback-sub-circuit (voltage divider) and the voltage feedback connector are small compared to the charging current so that the main part of the current flows along the single path through the components connected in series.

Similarly, the term "connected in parallel" can be understood as connected along multiple paths, such that essentially the same voltage is applied to the respective paths.

When a secondary battery is connected to the output connector of the electrical circuit for charging and the dc-converter is supplied with an input dc voltage, the dc-converter can provide a charging current to the secondary battery. When the battery voltage of the connected secondary battery is low, the feedback voltage is lower than the specified feedback voltage value. The dc-converter accordingly increases or provides the output current. With the positive temperature coefficient resistor connected in series to the secondary battery, the charging current flows through both components, the secondary battery as well as the positive temperature coefficient resistor. Thereby, energy is dissipated in the positive temperature coefficient resistor leading to a temperature increase and thus to an increase of the resistance of the positive temperature coefficient resistor. This has the effect that the feedback voltage also increases towards the specified feedback voltage value of the dc-converter. In reaction, the dc-converter preferably decreases the output current. Thus, in line with the proposal, the positive temperature coefficient resistor is connected to the voltage feedback connector such that the feedback-sub-circuit is working as a feedback regulation and limiter for the charging current. With the proposed electrical circuit, it is therefore possible to charge lithium-ion batteries, lithium polymer batteries and other modern secondary batteries with a regulated and not excessive charging current without the use of expensive charger ICs.

In an embodiment of the proposal, the feedback-sub-circuit of the electrical circuit comprises a voltage divider with at least two resistors, a first resistor and a second resistor. This voltage divider is disposed in parallel to the secondary battery and in series to the positive temperature coefficient resistor. This means that the voltage divider is disposed in a path connecting the positive terminal of the secondary battery and the negative terminal of the secondary battery wherein both, the negative terminal of the secondary battery and the connector of the voltage divider connected to the negative terminal of the secondary battery, are connected to the same connector of the positive temperature coefficient resistor. In the case of a voltage divider with two resistors, the voltage between the two resistors with respect to the negative terminal (cathode) of the secondary battery can be calculated from the resistances of the resistors and the battery voltage:

$$V = \frac{R_1 + R_2}{R_2} \cdot V_{bat}$$

In a preferred embodiment of the proposal, the voltage feedback connector of the dc-converter is connected to the voltage divider between the first resistor and the second resistor.

Accordingly, the value of the sensed feedback voltage at the voltage feedback connector is defined by the resistance of the resistors of the voltage divider and the battery voltage. The resistors of the voltage divider can be selected such that for a battery voltage corresponding to a fully charged battery, the voltage between the two resistors corresponds to the specified feedback voltage value of the dc-converter. Thus, the voltage divider is designed such that the dc-converter stops working, meaning that no charging current is provided to the secondary battery anymore, if the secondary battery is fully charged.

If, in contrast, the voltage level of the secondary battery is lower than that of a fully charged battery, also the sensed feedback voltage at the voltage feedback connector is lower than the specified feedback voltage value. In reaction, the dc-converter switches on the charging current. Preferably, the charging current applied depends on the amount of the difference of the specified feedback voltage value and the sensed feedback voltage.

In another aspect of the proposal, the feedback-sub-circuit comprises a feedback-switch enabling and/or disabling the feedback-sub-circuit. This is in particular useful, if no input voltage is applied to the dc-converter. In this case, the secondary battery would deliver a supply voltage to the voltage divider, leading to a standby current, if the feedback-sub-circuit is not interrupted by the feedback-switch. The feedback-switch opens the circuit of the voltage divider and the secondary battery. Once the feedback-switch is open, no current can flow from the secondary battery through the voltage divider discharging the secondary battery by an unwanted standby current.

In another embodiment of the proposal, the feedback-switch is switchable by the input voltage. Thus, if the input connector is not connected to a power supply, or a connected power supply does not deliver an input dc voltage or delivers an input dc voltage which is too low for the electrical circuit to function properly, the feedback-switch is switched off. It is therefore automatically avoided that a secondary battery connected to the electrical circuit is discharging in such a case. This is particularly important, since when a user uses a charging device with an electrical circuit for charging a secondary battery, the user often does not remove batteries from the charging device when the batteries are fully charged, but instead simply pulls off the plug of the charging device from the mains, thereby disconnecting the input dc voltage from the electrical circuit. This is often the case for household appliances.

Without the above described feedback-switch which is e.g. switchable by the input voltage, the battery would immediately start to discharge again over the voltage divider of the feedback-sub-circuit. When the user wants to use the batteries later, only a limited battery power would be available. In cases where the user would leave the batteries in the unplugged battery charger for a long time, this could even lead to a deep discharge of the battery, resulting in a reduced battery lifetime.

According to a further aspect of the proposal, at least one switchable bypass is connected to at least one of the resistors of the voltage divider for short-circuiting that resistor in the voltage divider. Hence, the bypass is connected between a first and a second connector of the respective resistor. In particular, the voltage divider can comprise a third resistor, wherein the switchable bypass is connected between the first and second connector of that third resistor.

By short-circuiting at least one of the resistors of the voltage divider, the properties of the voltage divider can be changed, leading to altered voltages at the at least two resistors. For example, at least three resistors can be provided in the voltage divider with the first resistor connected between the output connector and the voltage feedback connector and the second and third resistor between the voltage feedback connector and the positive temperature coefficient resistor. The bypass might then be arranged to switchably shortcut the second and/or third resistor. This switchable bypass can be used to change the voltage level at the voltage feedback connector for a given battery voltage. When the second or third resistor is bypassed, the feedback voltage drops to a smaller value leading to an increased charging current. On the other hand, when the bypass is switched off, the voltage level increases to a higher value, leading to a smaller charging current. It is for example possible to short-circuit the second or third resistor in a normal charging mode and switch off the bypass to reduce the charging current for a slow or trickle charging mode. This can be useful for example in very hot environments to avoid damage to the secondary battery or for deeply discharged secondary batteries.

It is also possible to have the bypass switched off in normal charging mode and bypass one of the resistors for a fast charging mode to achieve a higher charging current. This can be used, if the user needs to charge the battery in a very short time, risking a reduction in lifetime of the secondary battery.

Alternatively or additionally, a switchable bypass can be connected to a resistor connected between the output connector and the voltage feedback connector. In that case, bypassing the resistor leads to an increase of the feedback voltage and thus to a decrease of the charging current. It is thus possible to provide several resistors of the voltage divider with a switchable bypass, such that many different levels of charging current can be selected.

According to a preferred embodiment, the at least one switchable bypass is actuated by a control unit. By means of the switchable bypass, the control unit can adjust the feedback voltage and thus the charging current in a convenient way. For example, if a deep-discharged battery, having a voltage level lower than 3V, is to be charged, the charging current can be reduced in a preconditioning phase to protect the secondary battery. When the normal charging current is supposed to be 1 A, the charging current in the preconditioning phase may be lowered to 100 mA. After a predetermined period of time, or when a specified battery voltage is reached, the control unit can end the preconditioning phase by switching the bypass and thereby increasing the charging current. It is thus possible to automatically recharge deep-discharged batteries without the risk of damage to the battery. For deep discharged Li-Ion batteries, a low charging current is very recommended from the suppliers, for example.

The switchable bypass can be arranged such that in case of a deactivated control unit, an automatic preconditioning phase is initiated. When the control unit is deactivated, the control unit output connected to the switch has 0V. Hence, the bypass is switched off and the resistor limits the charging current, preventing the secondary battery from overcurrent.

According to another embodiment, the control unit is configured to set the end charging voltage by means of a pulse width modulation applied to the at least one switchable bypass.

The end charging voltage is the voltage supplied to the secondary battery, when the secondary battery approaches full charge and the charging current therefore is gradually decreased to zero.

The end charging voltage is defined by the resistances of the resistors of the voltage divider. The voltage will arrive at a value such that the voltage at the voltage feedback connector will be equal to the specified feedback voltage value of the dc-converter.

For example, with three resistors as described before, the end charging voltage can thus be calculated from the resistances and the specified feedback voltage value of the dc-converter:

$$V_{end} = \frac{R_1 + R_2 + R_3}{R_2 + R_3} \cdot V_{fb}$$

By applying a pulse width modulation (PWM) to the switchable bypass connected for example to the third resistor, this resistor may be switched on and off. When the bypass is switched on, the resistor is short circuited and therefore has an effective resistance of zero, wherein when the bypass is switched off, the resistor has an effective resistance of its nominal value. When the switchable bypass is switched on and off by the pulse width modulation, this leads to a mean value of the resistance of the third resistor:

$$R_{3mean} = R_3 \cdot \frac{t_{off}}{t_{on} + t_{off}}$$

In the case of PWM=100%, the bypass switch is switched on all the time, continuously short circuiting the third resistor. The off-time of the bypass is therefore $t_{off}=0$, resulting in a resistance of $R_{3mean}=0$. In the case of PWM=0%, the on-time of the bypass is $t_{on}=0$ and the resulting resistance is $R_{3mean}=R_3$. In the case of PWM=50%, the on-time equals the off-time, resulting in a resistance of $R_{3mean}=0.5 \cdot R_3$. This leads to the end charging voltage of the sensed feedback voltage:

$$V_{end} = \frac{R_1 + R_2 + R_{3mean}}{R_2 + R_{3mean}} \cdot V_{fb}$$

Hence, the control unit can regulate the end charging voltage by means of the pulse width modulation between the two values of:

$$\frac{R_1 + R_2 + R_3}{R_2 + R_3} \cdot V_{fb} \text{ and } \frac{R_1 + R_2}{R_2} \cdot V_{fb}$$

In another aspect the control unit is configured to limit the charging current by means of a pulse width modulation applied to the at least one switchable bypass.

As outlined above, by switching on and off a bypass of at least one of the resistors of the voltage divider, the voltage level at the voltage feedback connector can be shifted to change the charging current. By applying a pulse width modulation to the bypass during charging, the mean resistance of the respective bypassed resistor can be changed. Hence, the control unit can adjust the charging current to any value that lies between the charging current achieved with the respective bypass switched on and the bypass switched off.

For a pulse width modulation as described before it is suggested in line with the proposal that a suitable frequency for the pulse width modulation and a corresponding capacitance are used to smoothen the signal "seen" from feedback input of DC converter. The capacitor adapted to the modulation frequency filters away the switching off and on states of the PWM, so that the mean values described before are seen at the voltage feedback connector. This leads to a stable control of the charge current and/or the end charging voltage.

According to another aspect of the proposal, the voltage divider is configured such that a maximal end charging voltage is not exceeded in the case of a failure of the control unit.

This can be achieved by selecting adequate resistances for the resistors of the voltage divider. For example, in the case of failure of the control unit, the third resistor might be bypassed continuously. The effective resistance of the third resistor is therefore zero. Then the end charging voltage would reach:

$$V_{end} = \frac{R_1 + R_2}{R_2} \cdot V_{fb}$$

This end charging voltage might for instance be set to 4.5V by a corresponding choice of resistors. The voltage divider therefore functions as an over voltage protection implemented in hardware. The end charging voltage for normal operation could be set by software, for instance to 4.1V, with appropriate pulse width modulation on the bypass of the third resistor $R_3$.

According to an aspect of the proposal, the resistor with a positive temperature coefficient is a PPTC (Polymeric positive temperature coefficient resistor). Such a resistor has a resistance that increases several orders of magnitude, when the current through the PPTC exceeds a threshold value. Hence, an electrical circuit with a PPTC as the positive temperature coefficient resistor can reliably prevent overcurrent that could damage the secondary battery.

In another aspect of the proposal, a capacitance is arranged between the feedback voltage connector and ground and/or between the output connector and/or input connector and ground, in particular if PWM is used as described before. As already stated above, ground can be defined by the ground connector of the dc-converter. The capacitance can act as a smoothing capacitor, which can stabilize the voltage at the feedback connector, the input connector and/or the output connector.

In a further aspect of the proposal, the dc-converter may be a simple dc-converter providing an output current depended on a sensed feedback voltage without any further logic. Such a device is especially cheap and can therefore be used for low-cost devices.

Alternatively, the dc-converter may provide an output current depended on a sensed feedback-voltage and have a processor, for example in the form of a microcontroller, for adjusting the form of a charging sweep and/or absorbing PPTC and other resistor tolerances and/or defining a supplementary functional end voltage on a software level. An electrical circuit with a dc-converter with processor can deliver a very accurate output. Also, it is possible to provide for more complex output signals customized for the respective secondary battery. Hence, it can provide for an even better charging procedure with shorter charging times and longer battery lifetime.

In a further aspect of the proposal, a method for charging a secondary battery with one of the electrical circuits as described above is provided. In the process, the charging current of the secondary battery flows through the resistor with a positive temperature coefficient. This results in an increasing resistance of the resistor with a positive temperature coefficient due to the current through the resistor. This increased resistance limits the charging current of the secondary battery and results in the feedback-sub-circuit providing a higher voltage to the feedback input of the dc-converter. Hence, the battery is charged in a way that avoids overcurrent and the related risk of damage to the secondary battery.

Figure 1:
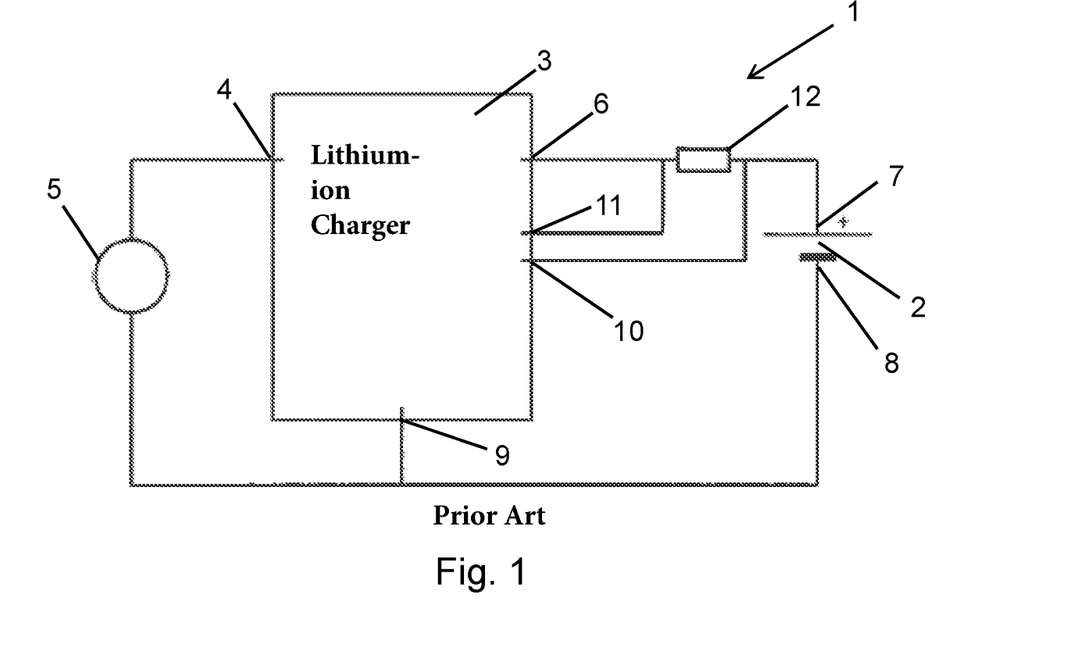
FIG. 1 shows a circuit diagram of a known CC/CV charger with a charger IC.

An already known electrical circuit 1 for charging a secondary battery 2, for example a lithium-ion battery, is shown in FIG. 1. The circuit comprises a lithium-ion charger IC (integrated circuit) 3 as central control element. The lithium-ion charger IC 3 has an input connector 4 for connecting the lithium-ion charger IC 3 to an input dc voltage 5. The lithium-ion charger IC 3 further comprises an output connector 6 which is connected to the positive terminal (anode) 7 of the secondary battery 2 via a shunt resistor 12. When the battery is charged, the charging current that flows through the secondary battery 2 also flows through the shunt resistor 12, leading to a voltage drop over the shunt resistor 12 which is proportional to the charging current 13. The negative terminal (cathode) 8 of the secondary battery 2 is connected to a ground connector 9 of the charger IC 3. The ground connector 9 is further connected to the ground of the input dc voltage 5. The lithium-ion charger IC 3 comprises two feedback connectors 10, 11. A voltage feedback connector 10, 11 might be used for determining the voltage 14 of the secondary battery 2 and a current feedback connector 10, 11 might be used to determine the charging current 13. By constantly measuring of the charging current 13 and the charging voltage 14, the lithium-ion charger IC 3 can regulate the output current to achieve a preprogrammed timeline of charging current 13 and charging voltage 14 like for example the one shown in FIG. 2.

Figure 2:
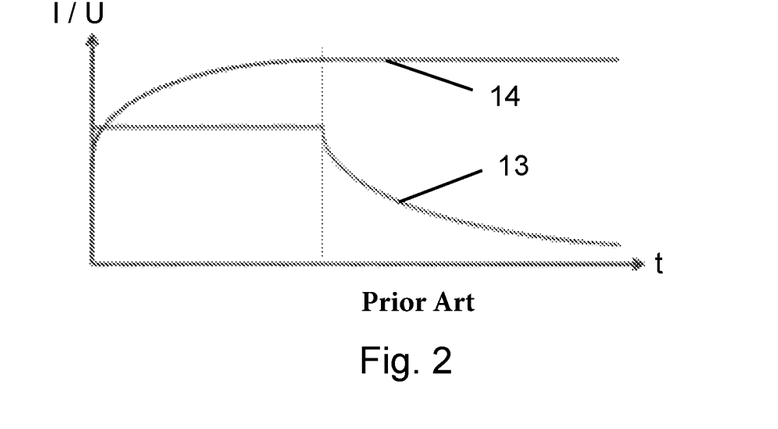
FIG. 2 shows a graph with the charging current and charging voltage over time of a known CC/CV charger with a charger IC.

The charging process depicted in FIG. 2 is a constant current (cc)/constant voltage (cv) charging process typically used for lithium-ion batteries and lithium polymer batteries. It shows the current I and the voltage U over the time t. The charging current 13 is held constant in the beginning of the charging process. This limits the charging current 13, avoiding an overcurrent in the beginning of the charging process. During that time, the charging voltage 14 increases gradually. After a predetermined period of time or when a predetermined value of the charging voltage 14 is reached, the charging process switches to a constant voltage phase. Typically, the constant voltage phase is started, when the battery voltage reaches the end of charging voltage. At that time the secondary battery typically is charged to 70% to 80% of its nominal capacitance. In the constant voltage phase, the charging voltage 14 is kept constant, while the charging current 13 gradually decreases with increasing battery charge.

The drawback of an electrical circuit 1 for charging a secondary battery 2 with a lithium-ion charger IC 3 implementing a CC/CV charging method is the high complexity that makes the lithium-ion charger IC 3 an expensive component.

In the following, a specific example of the proposed electrical circuit used in a household electrical appliance, such as a razor, epilator, toothbrush using secondary batteries, is described.

Figure 3:
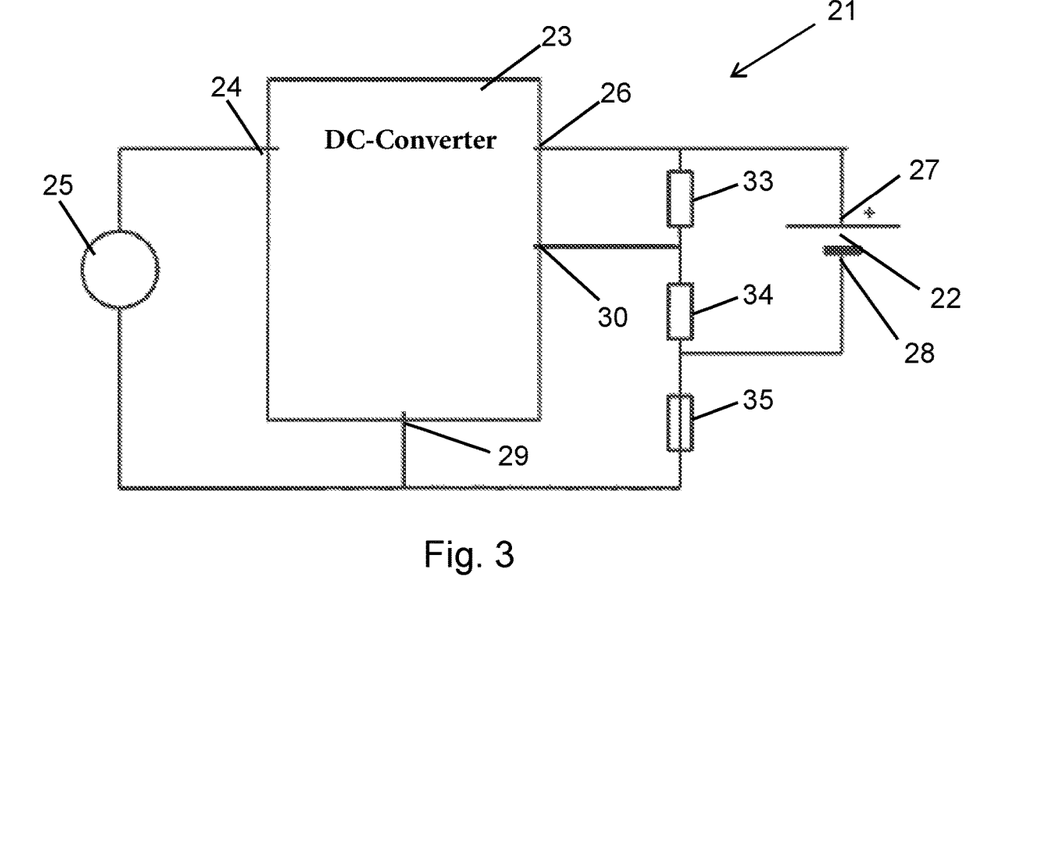
FIG. 3 shows a circuit diagram of a first embodiment of the proposed electronic circuit.

A proposed electrical circuit 21 for charging a secondary battery 22 with a standard dc-converter 23 is shown in FIG. 3. The dc-converter 23 comprises an input connector 24 connected to an input dc voltage 25. The ground of the input dc voltage 25 is connected to a ground connector 29 of the dc-converter 23. The dc-converter 23 further comprises an output connector 26 connected to an positive terminal 27 of the secondary battery 22. As (for example only one) feedback input, the dc-converter 23 comprises a voltage feedback connector 30. The voltage feedback connector 30 is connected to a voltage divider comprising two resistors 33, 34 arranged in series to each other and disposed in parallel to the secondary battery 22. The first resistor 33 of the voltage divider is connected to the output connector 26 of the dc-converter 23 and to the positive terminal 27 of the secondary battery 22 and the second resistor 34 of the voltage divider is connected to the negative terminal 28 of the secondary battery 22. The voltage feedback connector 30 is connected to the voltage divider between the two resistors 33, 34. A polymeric positive temperature coefficient resistor 35 is disposed in series to the secondary battery 22, connected to the negative terminal 28 of the secondary battery 22. The polymeric positive temperature coefficient resistor 35 is also connected in series to the voltage divider, connected to the second resistor 34 of the voltage divider and to the ground connector 29 of the dc-converter 23.

Thereby, the voltage at the voltage feedback connector 30 corresponds to a specific fraction of the battery voltage depending on the resistance values of the two resistors 33, 34 and on the voltage drop over the polymeric positive temperature coefficient resistor 35 caused by the charging current.

When an input dc voltage 25 is supplied to the dc-converter 23, the dc-converter 23 tries to maintain the feedback voltage, namely the voltage level at the voltage feedback connector to its specified feedback voltage value, for example to 0.8V, by adjusting the output current.

When a secondary battery 22 is connected to the electrical circuit 21, in the beginning the charging current is zero. The feedback voltage at the voltage feedback connector 30 is therefore only determined by the battery voltage and the resistance values of the two resistors 33, 34, which are selected such that the feedback voltage is smaller than the specified feedback voltage value, for example 0.8V, when the secondary battery has a battery voltage smaller than that of a fully charged battery. Hence, the dc-converter 23 supplies an output current to the output connector 26, charging the secondary battery 22. This output current flows through the polymeric positive temperature coefficient resistor 35 leading to a voltage drop over it. This voltage drop shifts the feedback voltage nearer to the specified feedback voltage value. The voltage level at the voltage feedback connector therefore corresponds to a superposition of the battery voltage and the charging current.

Since the resistance of the polymeric positive temperature coefficient resistor 35 is very small in the beginning, also the voltage drop is very small, leading only to a small shift of the feedback voltage that is at first not enough to reach the specified feedback voltage value. Further, the charging current dissipates energy in the polymeric positive temperature coefficient resistor 35 leading to an increase of the temperature of the polymeric positive temperature coefficient resistor 35 and therefore to an increase of the resistance of the polymeric positive temperature coefficient resistor 35. The increased resistance leads to a larger voltage drop over the polymeric positive temperature coefficient resistor 35 further shifting the feedback voltage to the specified feedback voltage value. When an output current is reached, for which the feedback voltage equals the specified feedback voltage value of the dc-converter 23, the dc-converter 23 stops increasing the output current. The polymeric positive temperature coefficient resistor 35 therefore acts as a limiter for the charging current.

Figure 4:
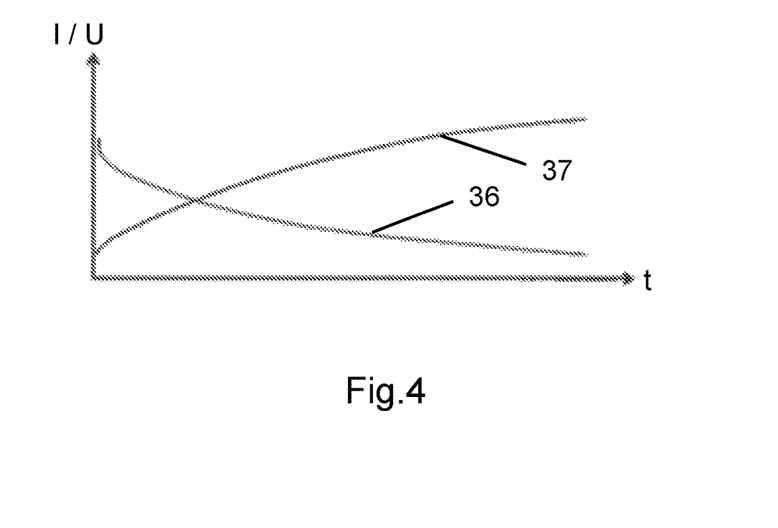
FIG. 4 shows a graph with the charging current and charging voltage over time of the proposed electronic circuit.

FIG. 4 shows the progress of the battery voltage 37 and the charging current 36 of the inventive electrical circuit 21 for charging a secondary battery 22. The battery voltage gradually increases over time to a value corresponding to the end charging voltage. The charging current 36 has a large value in the beginning, which is still small enough to avoid damage to the secondary battery and decreases gradually to zero. The progress of charging current and charging voltage over time is like that of an expensive charger IC 3 as depicted in FIG. 2, but is achieved with the much simpler and cheaper electrical circuit 21.

Figure 5:
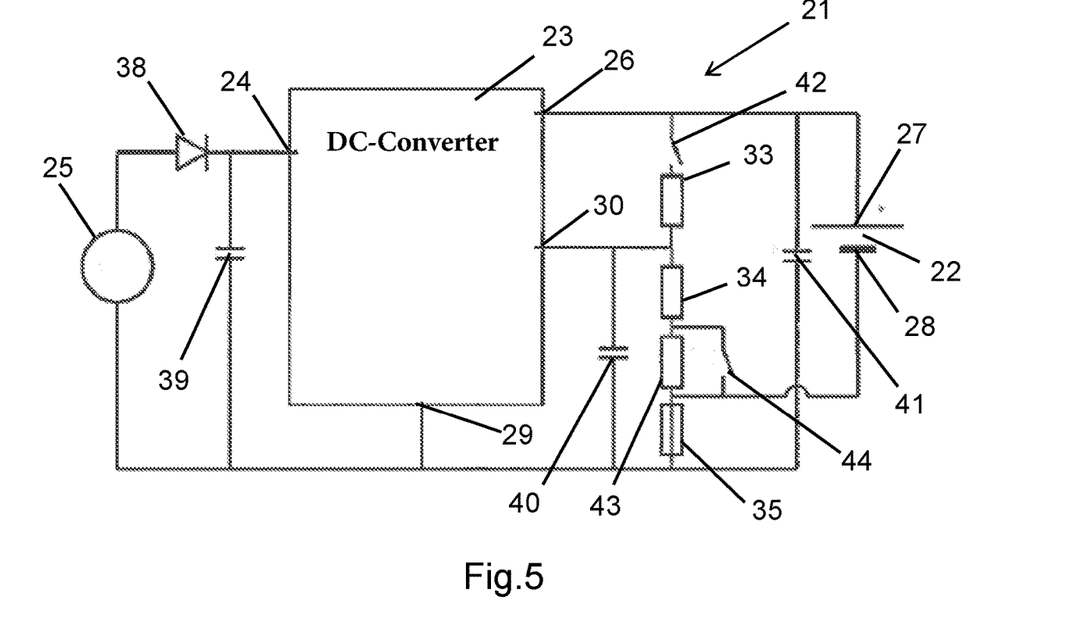
FIG. 5 shows a circuit diagram of a second embodiment of the proposed electronic circuit.

FIG. 5 shows another embodiment of the present proposal, which is based on the electrical circuit of FIG. 3 and comprises several additional features. A diode 38 is provided between the input dc voltage 25 and the input connector 24 of the dc-converter 23. This diode 38 prevents damage to the dc-converter 23 and the secondary battery 22 in case the input dc voltage 25 is supplied with wrong polarity. It is acting also as a reverse current blocking diode. The input connector 24 of the dc-converter 23 is further connected to a capacitor 39. The second connector of the capacitor 39 is connected to ground. This input capacitor 39 can stabilize the input voltage and filter voltage peaks in the input dc voltage that could lead to damage of the dc-converter 23 and/or the secondary battery 22.

Another capacitor 40 is connected between the voltage feedback connector and ground, smoothing high frequency noise on the feedback voltage. Noise at the feedback voltage could otherwise lead to irregular behavior of the dc-converter 23. This capacitor 49 is crucial for a PWM-filtering (pulse width modulation filtering) applied for regulating charging of the secondary battery 22. It is smoothing the feedback voltage at the voltage feedback connector 30 of the dc-converter 23, so that the pulse width modulation is not detectable at the voltage feedback connector 30.

Another capacitor 41 is provided between the output connector 26 of the dc-converter 23 and ground. The output current of the DC converter shows a (large) ripple (for example +−0.5 A with a nominal current of 1 A). The capacitance of the capacitor 41 removes this ripple so that the current flowing into the battery is smooth (and has no ripple). Supplementary, the ripple current would lead a (large) voltage ripple at the positive temperature coefficient resistor 35 (PPTC) and correspondingly at the voltage feedback connector 30. Therefore, the capacitor 41 might be provided according to the proposal to enhance the system quality and performance. The capacitor 41 thus smooths the output voltage, leading to a more constant output signal.

When the electrical circuit of FIG. 3 or 5 is not connected to an input dc voltage 25 but to a secondary battery 22, the battery voltage is applied to the voltage divider with resistors 33, 34 and 43 (in case of the circuit according to FIG. 5). Hence, unwanted standby current flows through the resistors 33, 34, 43, discharging the secondary battery 22. To avoid this standby current, the electrical circuit of FIG. 5 has a feedback-switch 42 arranged between the positive terminal 27 of the secondary battery 22 and the first resistor 33 (or in the line of the resistors 33, 34 and 43 connected in series) of the voltage divider. When the feedback switch 42 is opened, the feedback sub-circuit is disconnected from the secondary battery 22, preventing a standby current from flowing through the voltage divider with resistors 33, 34 and 43. The feedback-switch 42 can be a realized as a transistor, for example a MOSFET-transistor, connected to the input dc voltage such that the switch is closed when an input voltage is supplied to the dc-converter. Thereby, the feedback switch 42 automatically opens, when the input dc voltage is disconnected or too low.

The voltage divider of the electrical circuit of FIG. 5 comprises three resistors. A first resistor 33 is connected to the positive terminal 27 of the secondary battery via the feedback switch 42 and to the voltage feedback connector 30. The second and third resistors 34 and 43 are arranged in series to each other between the voltage feedback connector 30 and the negative terminal 28 of the secondary battery 22. The third resistor 43 has a switchable bypass 44 arranged between the first and the second connector of the resistor 43. Hence the resistor can be bypassed leading to an effective resistance of zero. The switchable bypass 44 is controlled by a control unit that can apply a pulse width modulation to the switchable bypass 44. The third resistor 43 with the switchable bypass can therefore fulfill many functions. The bypass can be switched off for a preconditioning phase with reduced charging current (trickle charge). The control unit can apply a pulse width modulation to the switchable bypass to regulate the output current. At the end of charging, the control unit can provide pulse width modulation to the switchable bypass to set the end charging voltage. In line with the proposal, this feature simulates a kind of CC/CV behavior using a simple pulse width modulation (PWM). When this pulse width modulation is used it is preferred to also provide the capacitor 40 between the voltage feedback connector 30 and ground for the reasons already discussed.

In order to give by way of example an idea of a suitable working range of the circuits shown in FIGS. 3 and 5 for typical applications with electric household appliances such as hair cutting or removal appliances (shaver, epilator), toothbrushes or skin treatment devices (massage), the following data are presented as typical working data of the circuits:

Battery end charging voltage: 4.05V
Battery over voltage protection: 4.25V
Specified feedback voltage value: 800 mV
Charging current: 1 A
Preconditioning/trickle current: 100 mA
DC input voltage: ~5-16V
Input current: ~350-900 mA It is within the scope of the proposal that these values might be amended by the one skilled in the art based on his knowledge to adapt the circuits to the requirements of certain appliances without departing from the idea of the proposal. The electrical components of the circuits are chosen by the one in the art according to his knowledge.

Figure 6:
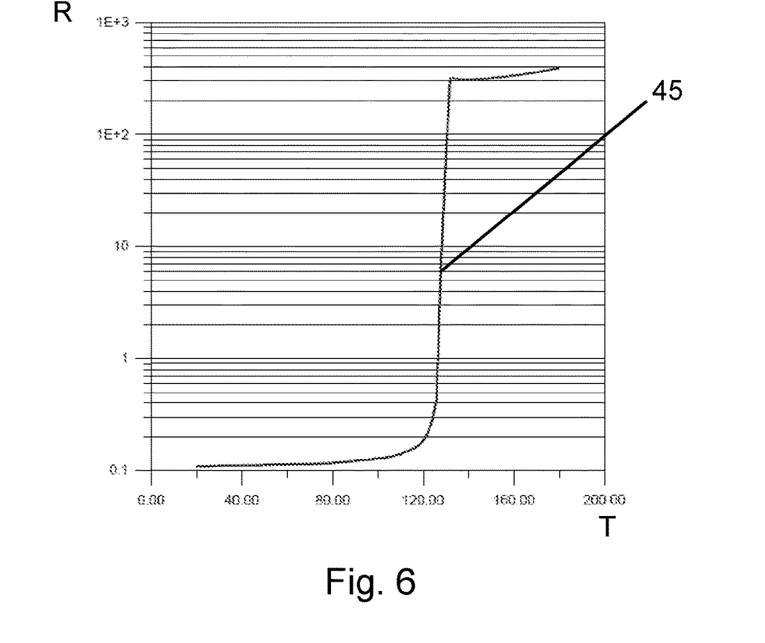
FIG. 6 shows a graph with the dependency of the resistance of a PPTC resistor from temperature.

FIG. 6 shows an example for the dependency of the resistance 45 of a PPTC from temperature. The dependency over the current is similar, because increasing current causes an internal increase of the temperature within the component. The flat part of the curve with very high resistance is reached after the so-called tripping of the PPTC. Preferably, this will not be reached in the electrical circuit according to the proposal. Already with much lower resistances, typically smaller than 0.5 Ohm, the voltage at the PPTC is already high enough so that the feedback voltage exceeds the specified feedback voltage value of the dc-converter and the dc-converter stops delivering a charging current to the secondary battery, thereby reducing the PPTC resistance quickly.

The proposed electrical circuit for charging a secondary battery and the corresponding method for charging a secondary battery provide for a cheap and simple alternative to the commonly used expensive charger ICs and ensures safe charging, avoids damage to the secondary battery and maintains the battery lifetime.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electrical circuit for charging a secondary battery having a dc-converter, the dc-converter comprising
   an input connector, connectable to an input dc voltage,
   an output connector, connectable to the positive terminal of the secondary battery for applying a charging current to the secondary battery and
   a voltage feedback connector for sensing a feedback voltage, wherein the dc-converter is adapted to regulate the output voltage by adjusting the output current at the output connector depending on the sensed feedback voltage;
   and a feedback-sub-circuit connected to the output connector and to the voltage feedback connector of the dc-converter, wherein
   the feedback-sub-circuit comprises a positive temperature coefficient resistor connectable in series to the secondary battery, wherein the positive temperature coefficient resistor is disposed in the electrical circuit between the negative terminal of the secondary battery and a ground connector of the dc-converter such that an increasing resistance of the positive temperature coefficient resistor results in an increasing voltage at the voltage feedback connector.

2. The electrical circuit according to claim 1, wherein
   the feedback-sub-circuit comprises a voltage divider, wherein the voltage divider is disposed in parallel to the secondary battery and in series to the positive temperature coefficient resistor and wherein the voltage divider comprises a first resistor and a second resistor.

3. The electrical circuit according to claim 2, wherein the voltage feedback connector of the dc-converter is connected to the voltage divider between the first resistor and the second resistor.

4. The electrical circuit according to claim 1, wherein
   the feedback-sub-circuit comprises a feedback-switch enabling and disabling the feedback-sub-circuit.

5. The electrical circuit according claim 4, wherein the feedback-switch is switchable by the input voltage.

6. The electrical circuit according to claim 2, wherein the voltage divider comprises a third resistor and a switchable bypass, said switchable bypass being connected between the first and second connectors of said third resistor for short-circuiting said third resistor in the voltage divider.

7. The electrical circuit according to claim 6, wherein the at least one switchable bypass is actuated by a control unit.

8. The electrical circuit according to claim 7, wherein the control unit is configured to set the end charging voltage by means of a pulse width modulation applied to the at least one switchable bypass.

9. The electrical circuit according to claim 7, wherein the control unit is configured to limit the charging current by means of a pulse width modulation applied to the at least one switchable bypass.

10. The electrical circuit according to claim 8, wherein
    the voltage divider is configured such that a maximal end charging voltage is not exceeded in the case of a failure of the control unit.

11. The electrical circuit according to claim 1, wherein
    the resistor with a positive temperature coefficient is a PPTC.

12. The electrical circuit according to claim 1, wherein
    a capacitance is arranged between the feedback voltage connector and ground and between input connector and ground.

13. The electrical circuit according to claim 1, wherein
    a capacitance is arranged between the feedback voltage connector and ground and between the output connector and ground.

14. The electrical circuit according to claim 1, wherein
    the dc-converter is any one of the following:
    simple dc-converter providing an output current depended on a sensed feedback voltage
    dc-converter providing an output current depended on a sensed feedback voltage having a processor.

15. Method for charging a secondary battery with an electrical circuit according to claim 1, wherein
    the charging current of the secondary battery flows through the resistor with a positive temperature coefficient;
    the resistance of the resistor with a positive temperature coefficient increases due to the current through the resistor;
    the increased resistance limits the charging current of the secondary battery and results in the feedback sub-circuit providing a higher voltage to the voltage feedback connector of the dc-converter.

* * * * *